US006885935B2

(12) United States Patent
MacPhail et al.

(10) Patent No.: US 6,885,935 B2
(45) Date of Patent: Apr. 26, 2005

(54) USE OF VEHICLE PERMISSIONS TO CONTROL INDIVIDUAL OPERATOR PARAMETERS IN A HIERARCHICAL TRAFFIC CONTROL SYSTEM

(75) Inventors: Margaret Gardner MacPhail, Austin, TX (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/351,168

(22) Filed: Jan. 23, 2003

(65) Prior Publication Data

US 2003/0144790 A1 Jul. 31, 2003

Related U.S. Application Data

(62) Division of application No. 09/964,932, filed on Sep. 27, 2001, now Pat. No. 6,574,547.

(51) Int. Cl.[7] .............................................. G06F 19/00

(52) U.S. Cl. ........................ 701/117; 701/119; 701/213

(58) Field of Search ................................ 701/201–213, 701/117, 118, 119; 340/933, 934, 935, 936

(56) References Cited

U.S. PATENT DOCUMENTS

| | | | |
|---|---|---|---|
| 3,402,289 A | 9/1968 | Burke | |
| 3,729,706 A | 4/1973 | Hein | 340/31 R |
| 4,167,785 A | 9/1979 | McReynolds | 364/437 |
| RE31,044 E | 9/1982 | McReynolds | 364/437 |
| 5,150,116 A | 9/1992 | West | 340/928 |
| 5,444,442 A | 8/1995 | Sadakata | 340/916 |
| 5,504,482 A | 4/1996 | Schreder | 340/995 |
| 5,530,441 A | 6/1996 | Takatou | 340/937 |
| 5,539,398 A | 7/1996 | Hall | 340/907 |
| 5,671,563 A | 9/1997 | Marcum | 49/49 |

(Continued)

FOREIGN PATENT DOCUMENTS

| | | |
|---|---|---|
| GB | 2349000 A | 10/2000 |
| WO | WO9709218 | 3/1997 |

OTHER PUBLICATIONS

Research Disclosure by International Business Machines Corp., No. RD 421140, May 1999, "RFID for Traffic Control".

Research Disclosure by International Business Machines Corp., No. RD 433061, "Automatic PDA / Server–based solution of navigation path planning".

Avivi, D., *Automatic Vehicle Identification,* CH3031–2/91/0000; pp. 96–99.

Tarry, S., et al., *Development of a Lorry Monitoring and Identification System,* Castle Rock Consultants, UK; University of Nottingham.

Shaw, L., *On Optimal Ramp Control of Traffic Jam Queues,* 1971 IEEE Conference on Decision & Control, Miami Beach, Florida.

(Continued)

*Primary Examiner*—Richard M. Camby
(74) *Attorney, Agent, or Firm*—Sawyer Law Group LLP

(57) ABSTRACT

A hierarchical traffic control system is disclosed. The traffic control system comprises a primary controller. The primary controller receives information about traffic in an area. The system further includes a plurality of subsidiary controllers. The subsidiary controllers provide information to and receive information from the primary controller. Each of the plurality of subsidiary controllers is associated with a cell within the area. Each of the subsidiary controllers receives and provides information to at least one vehicle concerning traffic conditions within its associated cell. The primary controller and each of the subsidiary controllers are capable of negotiating a change in the flow of traffic based upon traffic conditions. In this system, at least one vehicle within the traffic includes a third-party permission for operation.

7 Claims, 11 Drawing Sheets

U.S. PATENT DOCUMENTS

| | | | | |
|---|---|---|---|---|
| 5,758,313 | A | 5/1998 | Shah | 701/208 |
| 5,875,399 | A | 2/1999 | Kallin | 455/434 |
| 5,917,898 | A | 6/1999 | Bassa | 379/133 |
| 5,926,113 | A | 7/1999 | Jones | 340/906 |
| 5,948,040 | A | 9/1999 | DeLorme | 701/201 |
| 5,983,161 | A | 11/1999 | Lemelson | 701/301 |
| 5,986,575 | A | 11/1999 | Jones | 340/906 |
| 6,012,012 | A | 1/2000 | Fleck | 701/117 |
| 6,024,510 | A | 2/2000 | Kamienchick | 404/15 |
| 6,084,510 | A | 7/2000 | Lemelson | 340/539 |
| 6,104,316 | A | 8/2000 | Behr | 340/995 |
| 6,107,944 | A | 8/2000 | Behr | 340/995 |
| 6,112,152 | A | 8/2000 | Tuttle | 701/115 |
| 6,124,807 | A | 9/2000 | Heckeroth et al. | 340/908 |
| 6,133,854 | A | 10/2000 | Yee | 340/907 |
| 6,137,531 | A | 10/2000 | Kanzaki | 348/149 |
| 6,160,493 | A | 12/2000 | Smith | 340/902 |
| 6,161,071 | A | 12/2000 | Shuman | 701/48 |
| 6,167,333 | A | 12/2000 | Gehlot | 701/35 |
| 6,167,345 | A | 12/2000 | Strandberg | 701/117 |
| 6,173,231 | B1 | 1/2001 | Chojnacki | 701/208 |
| 6,185,484 | B1 | 2/2001 | Rhinehart | 701/1 |
| 6,199,045 | B1 | 3/2001 | Giniger | 705/1 |
| 6,202,023 | B1 | 3/2001 | Hancock | 701/201 |

OTHER PUBLICATIONS

Lee, J.H., *A Real–Time Traffic Control Scheme of Multiple AGV Systems for Collision Free Minimum Time Motion: A Routing Table Approach,* IEEE Ttransactions on Systems, Man, and Cybernetics—Part a: Systems and Humans, vol. 28, No. 3, May 1998.

Gupta, A., et al., *Parallel Algorithms for Vehicle Routing Problems,* IEEE 1094–7256/97, pp. 144–151.

Schalkwijk, *Simulation of Traffic Flow through Large Traffic Nets,* Verkeer en Verkeerstechniek, Nov. 1, 1968, pp. V45–V51.

Journet, B., *Laser Rangefinders for Autonomous Intelligent Cruise Control Systems,* SPIE vol. 3207•0277–786X/98, pp. 65–71.

Beros, S., et al., *The Vehicle Recognition Based on Adaptive Logic Network,* Automatizacija u prometu '96, Split, Ancona 27–29. 11. 1996., pp. 28–33.

Hamamatsu, Y., *Approximate Solution of Vehicle Behavior under Time Limit for Merging at an Intersection of AGT,* Modelling, Simulation and Identification, Proceedings of IASTED Intl. Conf., Wakayama, Japan, Sep. 12–16, 1994, pp. 183–186.

Fijalkowski, B.T., et al., *Concept for a Mechatronically Controlled Full–time 4WD×4WB×4WA×4WS Intelligent Vehicle for Drivers with Special Needs,* ISATA 1994 Proceedings, vol. 4, pp. 161–172.

Janko, J., *An Algorithm for an Incident Management in a Route Guidance System,* IFAC Control, Computers, Communications in Transportation, Paris, France 1989, pp. 277–277–280.

Yagoda, HN, *The Dynamic Control of Automotive Traffic at a Freeway Entrance Ramp,* automatica, vol. 6, No. 3, May 1970, pp. 393.

Bates, et al., *A Distributed System and Method for Detecting Traffic Patterns,* US Patent Application under prosecution by International Business Machines Corp., IBM Docket No. ROC9–1999–0206.

100

USE OF VEHICLE PERMISSIONS TO CONTROL INDIVIDUAL OPERATOR PARAMETERS IN A HIERARCHICAL TRAFFIC CONTROL SYSTEM

This application is a division of Ser. No. 09/964,932 filed Sep. 27, 2001 now U.S. Pat. No. 6,574,547.

FIELD OF THE INVENTION

The present invention relates generally to traffic flow control and specifically to a system and method for providing for vehicle permissions to control vehicle operation by a third party.

BACKGROUND OF THE INVENTION

Today, vehicle drivers generally use paper maps, or in some cases electronic maps, to guide them to their destinations. In other cases a driver may be shown the route either by one giving them directions or driving the route. Once a driver no longer needs directional guidance than he/she may follow the route based upon routine or habit. Thus, drivers select their routes based on habit or routine, generally resulting in non-optimal use of the road network under actual conditions. This is because congestion information is typically not known to drivers and as a result they are not able to navigate so as to avoid the congestion. Anecdotal traffic and road condition information is occasionally available from radio broadcasts, and in rare instances by variable message signs that have been installed in the infrastructure. Such information sources, however, are sparse in the information that they convey and difficult for many drivers to act upon. In addition, road condition information is most often delivered too late to help in preventing major congestion; mostly the conditions that will cause congestion are not noted early enough.

For example, for a driver unfamiliar with an area, information such as "congestion ahead" from a variable message sign will not provide sufficient information to allow the driver to alter his original route. Non-recurring congestion (e.g., traffic accidents) can cause immense traffic tie-ups and delays. If drivers upstream from these events had adequate information about the congestion and about alternative routes, however, the resulting congestion could be reduced. In addition, if a plurality of alternative routes are available, and if the drivers could be guided in such a way as to optimally use the alternative routes, then the congestion resulting from an incident, as well as from normal traffic patterns, could be greatly minimized.

There is also a type of recurrent congestion (due either to poorly designed roads, or overloading of roads, poorly timed traffic control devices, misuse of lanes, etc.). An example is a multi lane road with a turn lane where the turn lane is used by drivers to pass slower traffic and then merge back into non-turning traffic. These points are analogous to ice crystals forming in supercooled water—drivers that are slower to respond (i.e., traffic works on a lowest common denominator—thus one slow reacting driver creates rippling/magnifying delays for all of the other drivers).

U.S. Pat. No. 5,172,321 teaches a method by which dynamic traffic information is communicated to vehicles over a wireless modality so that route selection algorithms in the vehicle can select an optimum route. This is an improvement, but can itself result in unstable traffic flow. Each vehicle receives the same information, and drivers have no knowledge of the route selections of other drivers, allowing the likely possibility of subsequent traffic instability (e.g., traffic jams) if many vehicles choose the same alternate route based on the same information. This system requires a high bandwidth to communicate all dynamic traffic data to all vehicles in areas with a dense road infrastructure. As a result, to be practical, the system must limit its information broadcast to traffic conditions of the most heavily traveled routes.

As can be seen, a need has arisen for a system for determining optimal traffic flow based upon current and projected traffic and road information, and for communicating that information to vehicles.

U.S. Pat. No. 5,619,821 entitled "Optimal and Stable Planning System" addresses this problem by providing a system for determining optimal vehicle routes using current traffic flow information received from individual vehicles. The system comprises one or more fixed computers connected via a wide area network, the computers storing a model of a road network specifying the geometry of road segments and traffic characteristics of the road segments; communication means allowing fixed and wireless communication between the fixed computers and mobile in-vehicle computer units, and also fixed communication among the fixed computers; means in the fixed computers for computing an optimal route for each vehicle based upon data supplied by the in-vehicle units; and means for communicating optimal route information to the in-vehicle units.

Although the system works effectively for its stated purpose, as is noted it computes the optimal route based upon in-vehicle information, but does not necessarily take into account other issues that may arise, apart from information by the vehicles. For example, an emergency may occur that is not generally known, such as an impending storm, hurricane or other naturally occurring disaster. In addition, there may be some other type of emergency, such as a fire or the like, that may require a change in traffic flow or the like.

There are other issues with traffic control which are not addressed by the above-cited references. Accordingly, it would be desirable to allow an owner of a vehicle to control the use of a vehicle by another. For example, it would be desirable for a parent to automatically control the use of an automobile by his/her child. In another example, it would be desirable for a rental car to automatically control the use of their cars by the people who lease the cars. Finally, in a third example it would be desirable to allow a governmental authority, such as the court, to automatically control the time and distance that an individual can drive a vehicle if the individual has been convicted of a crime such as drunk driving. None of the above-identified systems address these problems.

What is needed is a system to overcome the above-identified problems. The present invention addresses such a need.

SUMMARY OF THE INVENTION

A hierarchical traffic control system is disclosed. The traffic control system comprises a primary controller. The primary controller receives information about traffic in an area. The system further includes a plurality of subsidiary controllers. The subsidiary controllers provide information to and receive information from the primary controller. Each of the plurality of subsidiary controllers is associated with a cell within the area. Each of the subsidiary controllers receives and provides information to at least one vehicle concerning traffic conditions within its associated cell. The primary controller and each of the subsidiary controllers are capable of negotiating a change in the flow of traffic based upon traffic conditions. In this system, at least one vehicle within the traffic includes a third-party permission for operation.

A system and method in accordance with the present invention provides for the use of individual operator sign-on to vehicle or default permissions without sign-on to control the parameters of operation. For example, parents can set teenager parameters, rental car owners can set driver parameters, commercial fleet managers can set parameters, permissions can be set for valet drivers. These parameters can include allowable areas to operate the vehicle, e.g., can't drive to Mexico or to the liquor store, and providing for speeds and weight loads. These permissions can cover a wide range of vehicle operation as opposed to mechanical speed governors or valet keys.

DETAILED DESCRIPTION

The present invention relates generally to traffic flow control and specifically to a system and method for controlling traffic routing and flow. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
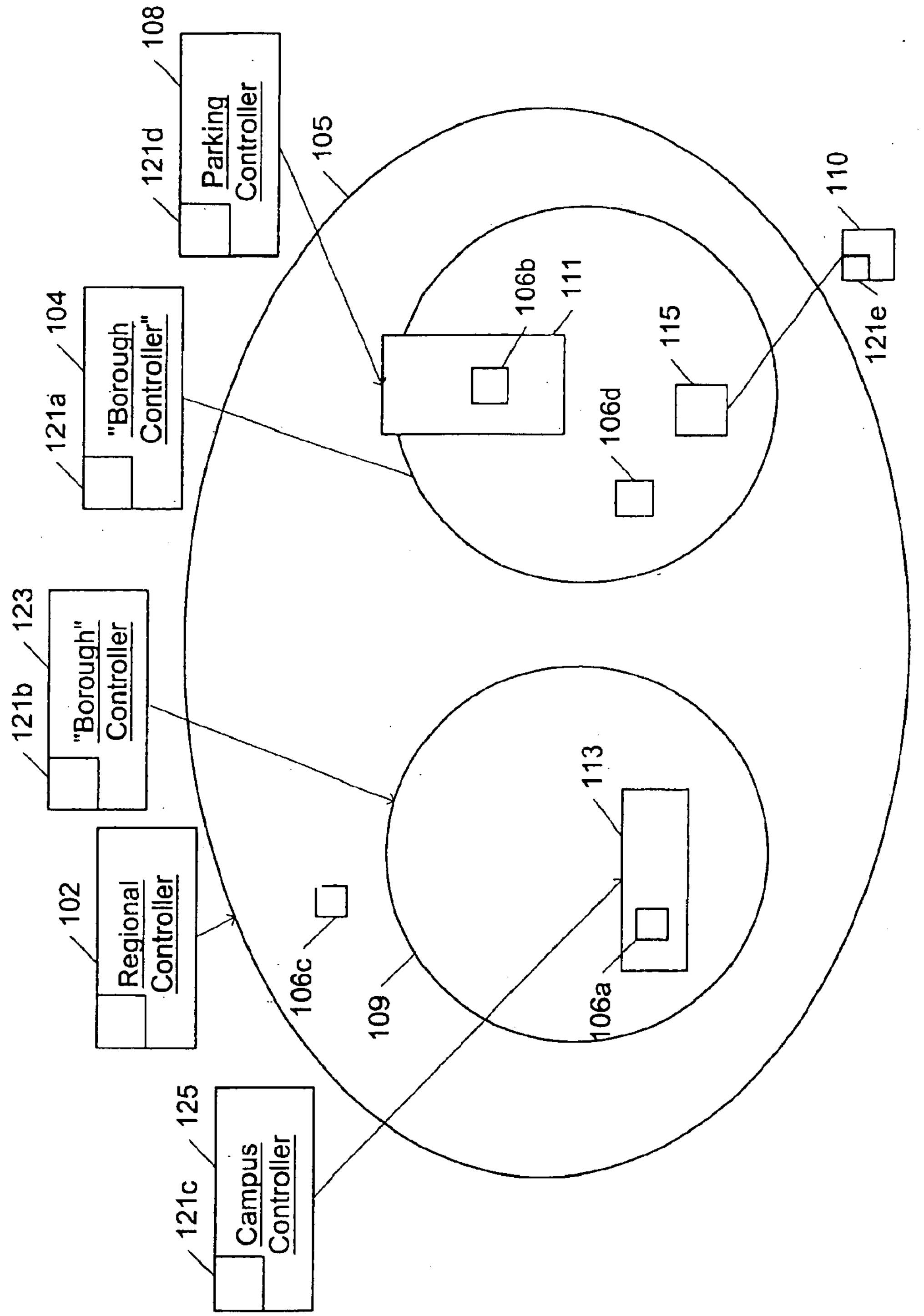
FIG. 1 is a block diagram of a traffic control system in accordance with the present invention.

FIG. 1 is a block diagram of a traffic control system 100 in accordance with the present invention. The traffic control system 100 includes a hierarchy of controllers. One of ordinary skill in the art should readily recognize, that although this will be described in the context of a preferred embodiment of controllers, any type of hierarchy of controllers could be utilized, and that use would be within the spirit and scope of the present invention. The key issue is that these controllers are hierarchical and nestable, that is, that they are able to communicate with each other and affect each other's operation.

In this embodiment there may be one regional controller 102 which is a primary controller and may be, for example, to control and monitor vehicles within a region of several cities. In addition, in this embodiment, there is a plurality of subsidiary controllers. For example, borough or city controllers 104 and 123 are utilized to control and monitor vehicles within their respective areas. In a preferred embodiment, an autonomous entity controller 125, for example, a campus controller for a college, is utilized to control and monitor vehicles within this area. Also, as is seen, there is a controller 108 for a smaller area, such as a parking lot. The parking controller 108 controls and monitors vehicles within the parking lot. Finally, there may be a controller that is ephemeral, such as controller 110, for a particular event, such as sports or other type of event. The ephemeral controller 110 would control and monitor vehicles within such an event.

As above mentioned, each of the subsidiary controllers 104, 108, 110, 123 and 125 monitors the vehicle position and make suggestions for adjustments to the vehicle's path and speed based on up to the minute traffic data. In addition, the traffic controller system 100 could manage the lanes and lights or could interface with a system that manages the same.

Typically, the subsidiary controllers 104, 108, 110, 123 and 125 are in communication with the regional controller 102 and can be in communication with each other. A vehicle 106*a*–106*d*, as before mentioned, has the capability of interacting with each of the subsidiary controllers 104, 108, 110, 123 and 125 while in the cell 105, 107, 109, 111, 113 or 115 associated with its respective controller. The subsidiary controllers 104, 108, 110, 123 and 125 could be automated or an individual could be located therewithin.

Each of the subsidiary controllers 104, 108, 110, 123 and 125 typically includes a server system 121*a*–121*e* that is tracking each vehicle within its cell. Each server system 121*a*–121*e* includes a predictive system which can calculate where a vehicle is moving and how quickly it will reach its destination. Within each of the server systems 121*a*–121*e* is a database which is object oriented. That is, each of the databases includes a plurality of participant objects. These participant objects are utilized by the controllers to manage the operation of vehicles within the system.

Figure 2:
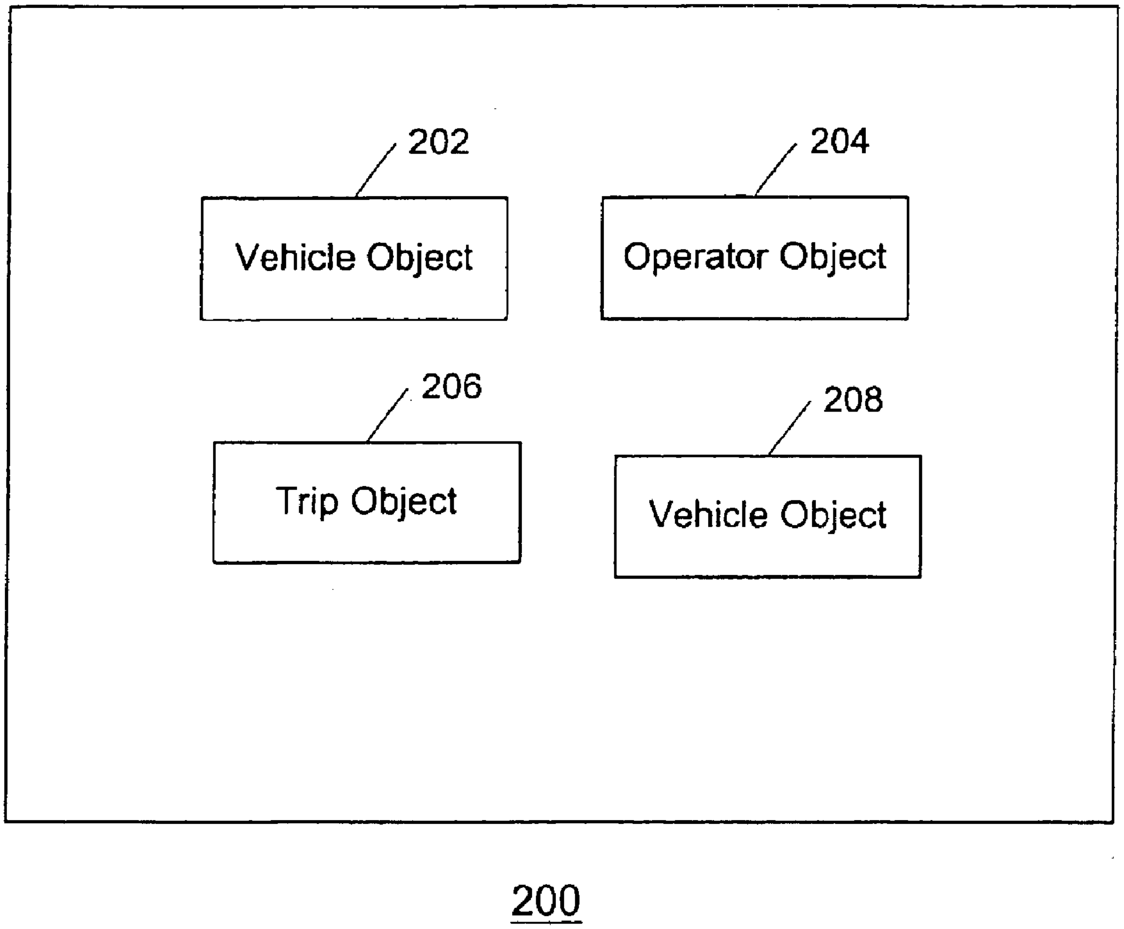
FIG. 2 illustrates the plurality of participant objects in a participant pool.

FIG. 2 illustrates the plurality of participant objects in a participant pool 200. The participant pool 200 is within the database of the server within the controller. A participant object has three primary elements which interact and influence its behavior. One is the physical object being represented, a second is an operator who can manipulate or direct the object, and the third trip plan, in the case of mobile objects. In a preferred embodiment, objects that are available are a vehicle object 202, an operator object 204, a trip object 206, and a segment object 208. The functions and features of each of these objects are described in detail hereinbelow Vehicle Object 202

A vehicle object 202 typically includes the make, model and capabilities and limitations of the vehicle. For example, it would include the height, weight, maximum speed and the like.

Operator Object 204

An operator object 204 typically includes information about the operator. It would typically include height, weight, and age information. The operator object would also include the class of drivers license (i.e., learner's permit, limousine permit, etc.) and any capabilities, features or limitations of the operator.

Trip Object 206

A trip object 206 indicates the trip plan of the vehicle. The trip object 206 could come from a preplanned trip information, such as a trip to work or a vacation. The trip object 206 could be related to historical information, once again, repeated trips to work, for groceries or to a relative.

Segment Object 208

Figure 3:
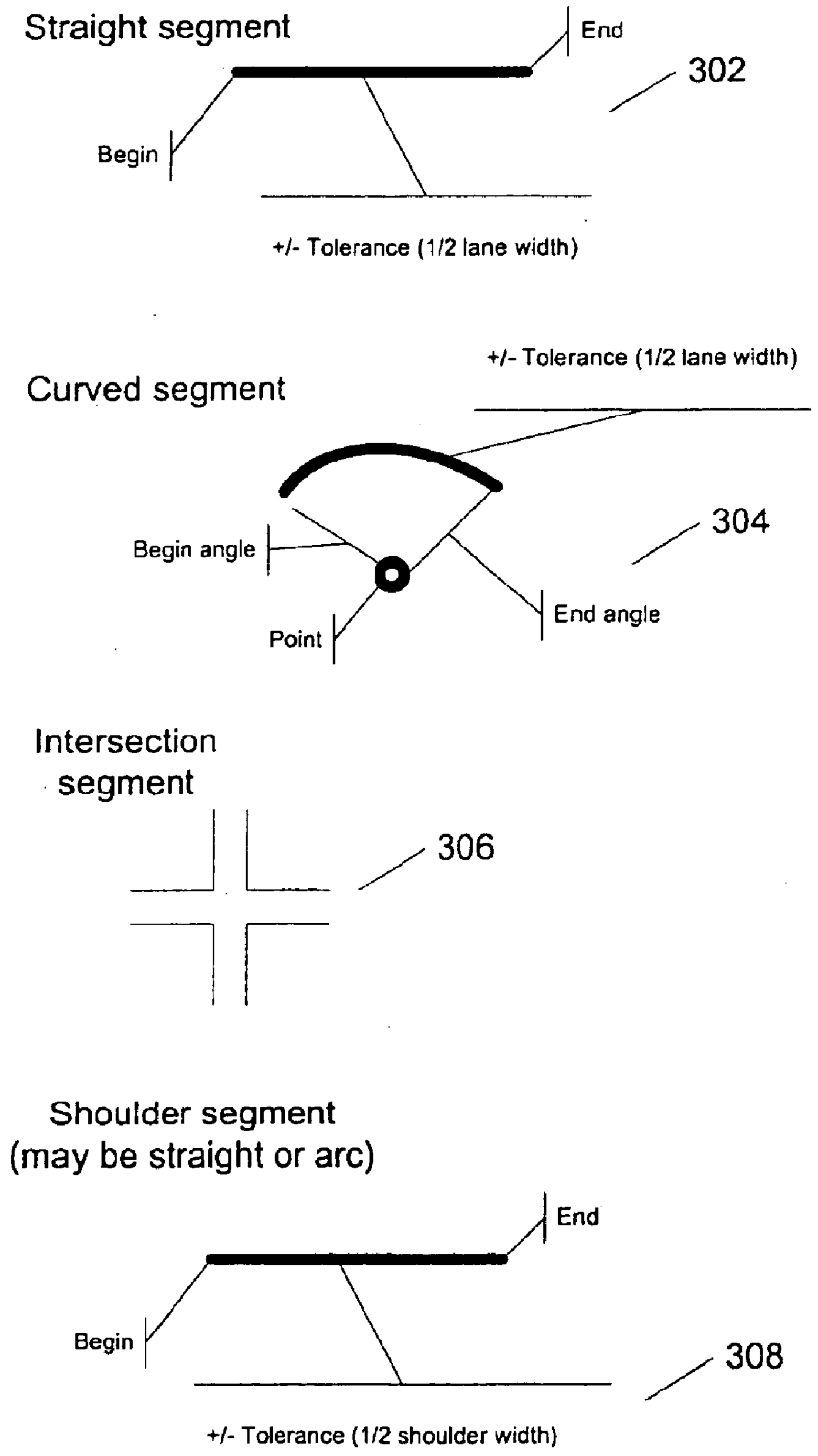
FIG. 3 illustrates a plurality of segment objects in accordance with the present invention.

A segment object indicates information about a segment of the road within a controller domain. FIG. 3 illustrates a plurality of segment objects in accordance with the present invention. The plurality of segment objects in a preferred embodiment include a straight segment object 302, a curve segment object 304, an intersection segment object 306 and shoulder intersection object 308. A straight segment object 302 has a beginning and an ending point, and for example, directionality from beginning to end may denote one direction and flags may, for example, denote that there is a two-way flow. In a preferred embodiment, the tolerance may be ±½ lane width to allow a particular vehicle to have the right of way therein. A curve segment object 304 has a begin angle, an end angle, and a point which denotes both of those angles. An intersection segment object 306 which provides an array of ports which denote the entrances and exits to an intersection. A shoulder segment object 308 may be straight or an arc, may be a description of a surface like a drop-off and facilities like emergency telephones to allow for traffic control.

The controllers within the traffic controller system are computationally intensive due to the large number of objects and the large amount of information within each object. For example, on a typical super highway, there may be several lanes which are represented by segment objects, turn offs, shoulders, all of which are represented by segment objects, several vehicles of various sizes and classes, further represented by various participant objects. Accordingly, the controllers could be implemented by supercomputers, by distributed processors or other compiling architectures to represent the participant objects in an effective and efficient manner.

Referring back to FIG. 1, each controller can appropriately suggest a change of route of a vehicle based upon the controller's determination of the vehicle's status based upon the participant objects associated with the particular vehicle. Typically in this type of system, a driver of the vehicle 106 will provide a trip plan which is communicated to the primary controller 102, either directly or by the subsidiary controllers 104, 108, 110, 123 and 125.

All of the controllers 102, 104, 108, 110, 123 and 125, via the various participant objects, in cooperation, provide for the most efficient route for a vehicle. The regional controller 102 has control over and monitors all of the other controllers. Each of the subsidiary controllers 104, 108, 110, 123 and 125 can provide information to the vehicle within its particular cell via the participant objects and to other controllers either directly or through the regional controller 102. Also, as is seen, some cells can have overlapping responsibilities and those overlapping responsibilities can be controlled by each of the controllers within that particular cell. The most efficient route is determined by the location of the vehicle. For example, if a vehicle is traveling within a cell, the controller responsible for that cell would make suggestions via the participant objects to the vehicle concerning the most efficient route. On the other hand, if a vehicle is traveling between cells (i.e., traveling between cities), a higher level controller would make suggestions to the vehicle concerning the most efficient route.

A vehicle can communicate information about start and stop positions via the participant objects, in addition to optional information like driver patterns and preferences to the regional controller 102 via a trip plan which as before mentioned can be supplied via a trip object. The regional controller 102 will then plot the best path based on the trip plan and also from input from the current and projected traffic loads and provide that information back to the vehicle. Through the use of this system, a hierarchical traffic control system is provided in which each of the subsidiary controllers 104, 108, 110, 123 and 125 monitors and controls the traffic within its cell and the regional controller 102 provides an overall control plan based on the flow of traffic in the entire system.

As is seen, a plurality of vehicles **106*a*–106*d*** can travel in and between different cells via the various segments. Although only four vehicles are shown for the sake of simplicity, one of ordinary skill in the art readily recognizes that typically a plurality of vehicles are travelling within the cells being monitored and there can be several segments representing routes, highways, and roads, etc. monitored by each of the controllers.

Figure 4:
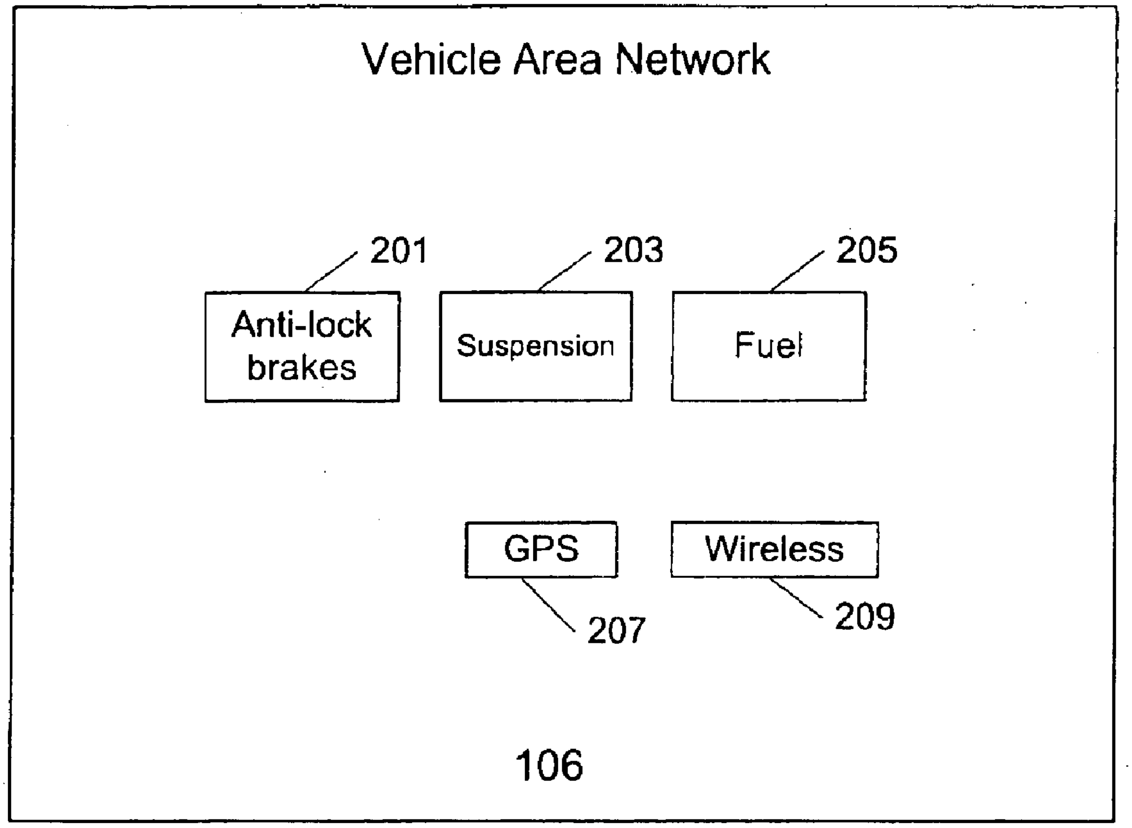
FIG. 4 illustrates a vehicle utilized with the system in accordance with the present invention.

FIG. 4 illustrates the vehicle 106 utilized within the system 100 in accordance with the present invention. Typically, an enabled vehicle 106 will include a vehicle area network that allows for the vehicle and its occupants to communicate with the controllers. In this embodiment, the vehicle 106 includes a plurality of systems, which can be monitored, such as anti-lock braking system 201, the suspension system 202 and fuel level system 205. Although these particular systems are shown in the vehicle area network, one of ordinary skill in the art recognizes there are a variety of other conditions or systems, such as battery life, oil conditions, light indicators and the like, that can be monitored and their use would be within the spirit and scope of the present invention. For example, if the engine shuts down in a manner such that the vehicle is an obstruction, the vehicle could communicate this information to the controller of the particular cell and that information could be used to allow that controller to make suggestions to other vehicles within the cell or area.

The vehicle 106 also includes wireless communications systems 207 and a global positioning system (GPS) locating apparatus 209 therewithin. The wireless communications allow for two-way communication between the vehicle and the controllers.

Accordingly, the occupants of the vehicles can communicate with the traffic controllers directly to ensure that specific issues are addressed via voice communication. In addition, the location of the vehicle in a particular environment can be tracked using a GPS location system 209. The GPS location system 209 could be used in a variety of fashions. For example, the GPS location system 209 can be within a vehicle, or triangulation on a cell phone or some other wireless scheme.

One of the features of the present invention is that a vehicle can provide feedback to the traffic controller. A vehicle may automatically provide information about its condition by sending vehicle operation information. This vehicle information is added to the vehicle object within the controller. For example, the database within the controller system that receives location information for a defined segment of a road can analyze the data to determine where and how the vehicle can move to avoid the road hazard. In addition, a GPS monitoring system could include input from the driver as to the nature of the problem. The controller can then add this information to the vehicle object. The controller can then warn other drivers of the hazard.

Figure 5:
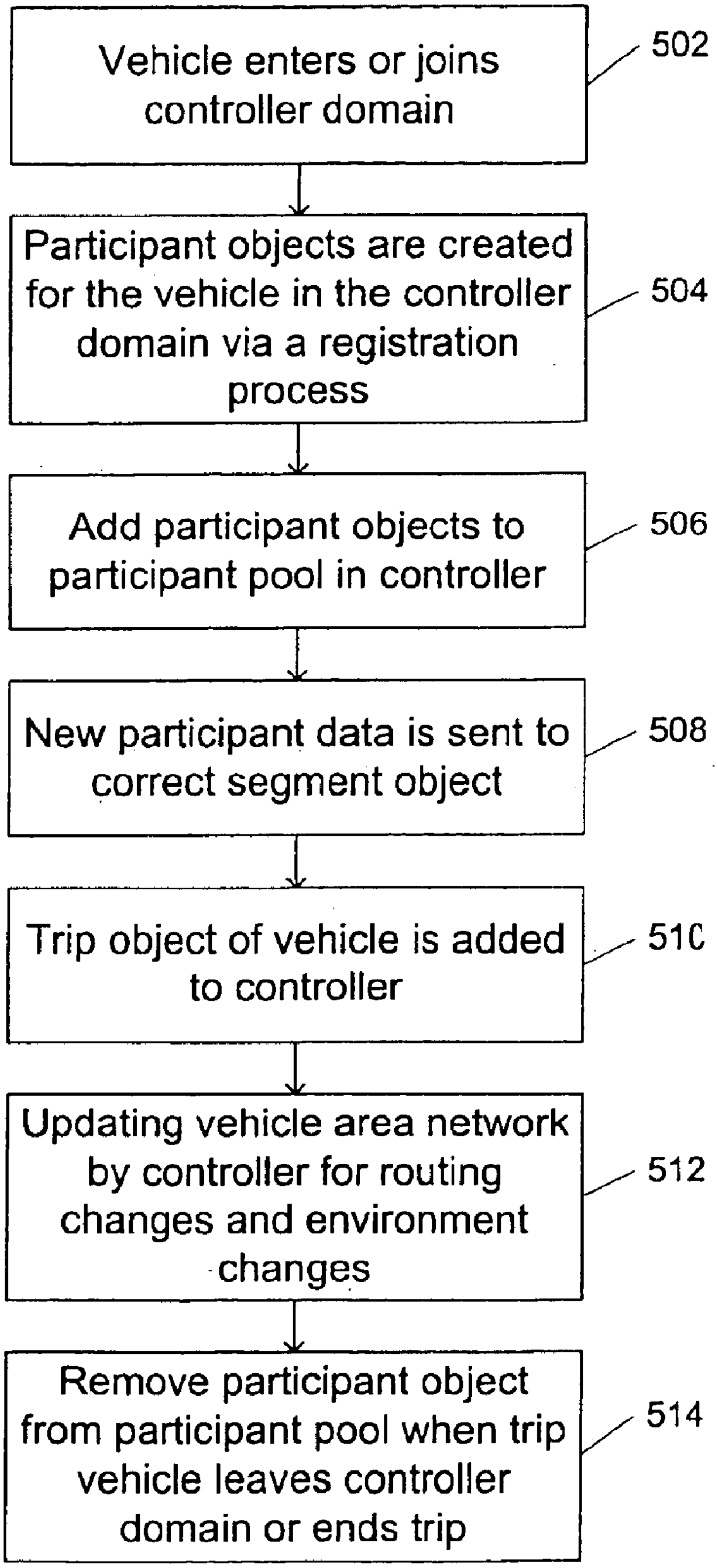
FIG. 5 is a flow chart illustrating operation of a controller when receiving from and providing information to a vehicle.
Figure 6:
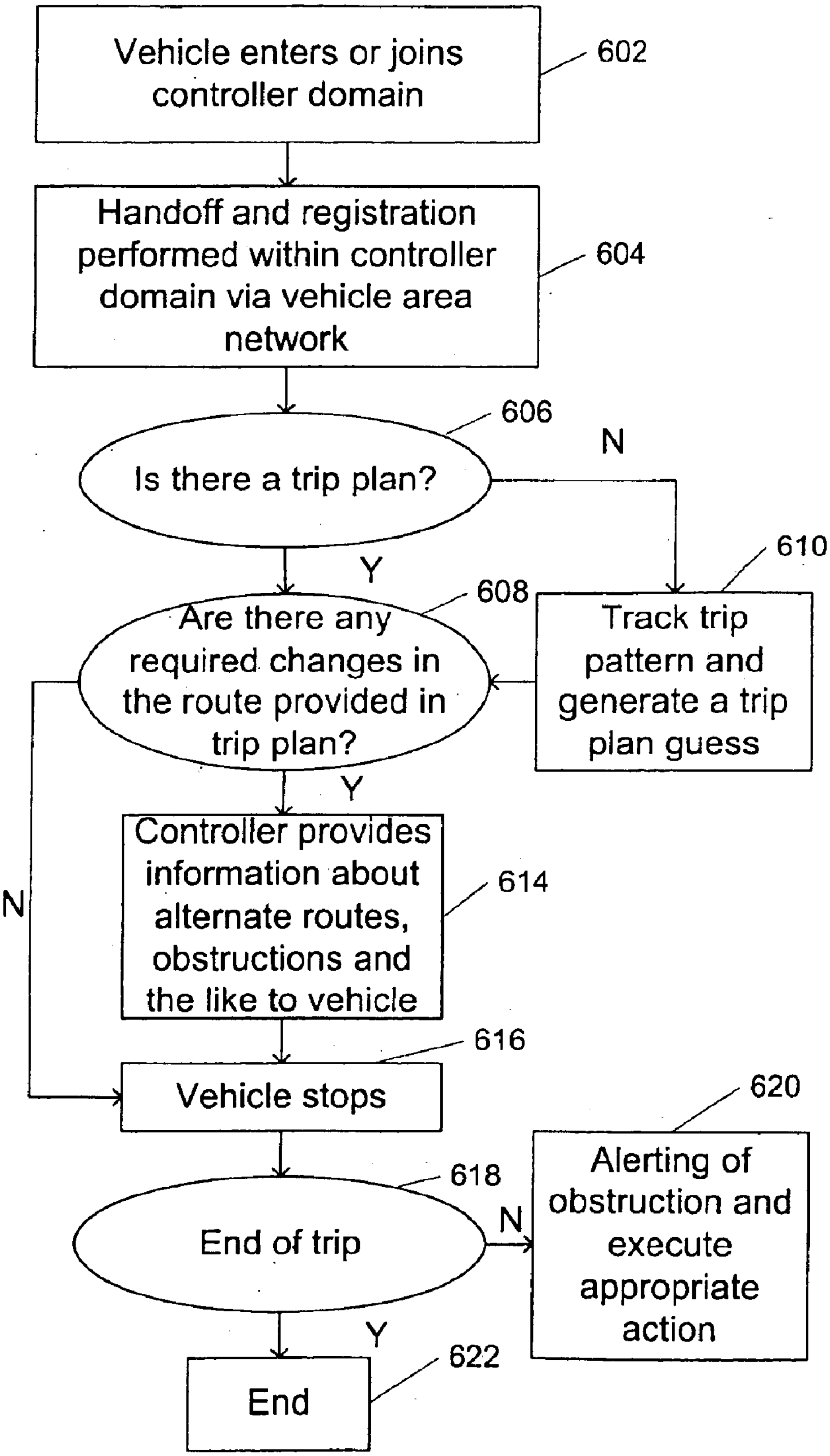
FIG. 6 is a flow chart illustrating the operation of a vehicle within a controller domain.
Figure 7:
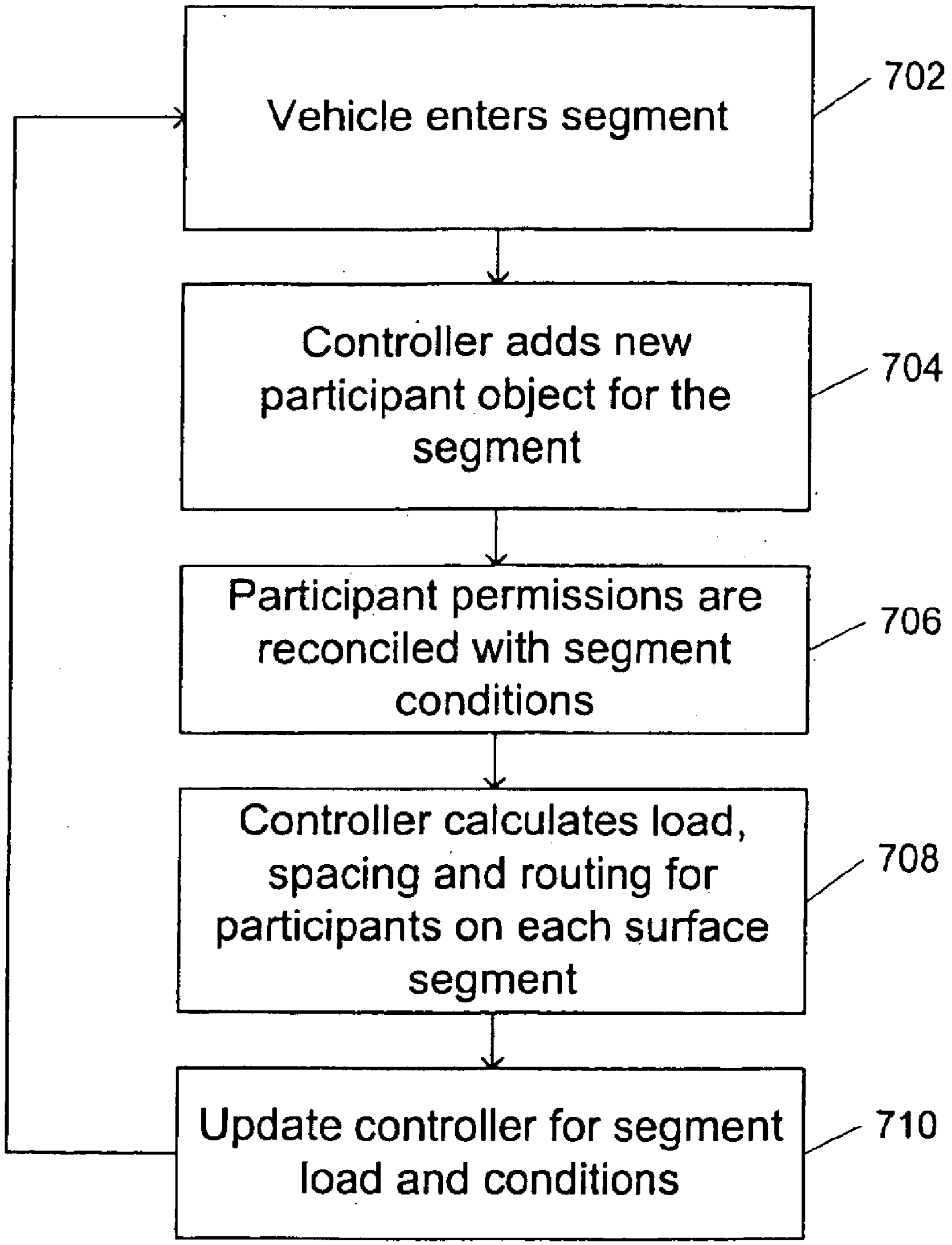
FIG. 7 is a flow chart illustrating the use of a segment object when vehicles are traveling through a segment associated with the segment object.

Information about the vehicles and segments is utilized by the controllers to effectively route vehicles to appropriate destinations. To more specifically describe their interaction, refer now to the following description in conjunction with the accompanying figures. These interactions will be described from different viewpoints utilizing three figures. FIG. 5 is a flow chart illustrating operation of a controller when receiving information from and providing information to a vehicle. FIG. 6 is a flow chart illustrating the operation of a vehicle within a controller domain. FIG. 7 is a flow chart illustrating the use of a segment object when vehicles are traveling through a segment associated with the segment object.

FIG. 5 illustrates a controller interaction with the vehicle and the segments. First, a vehicle enters or joins a controller domain, via step 502. The vehicle area network when it enters the controller domain provides a plurality of information to the database of the controller as above described. Initially, participant objects are created for the vehicle in the controller domain via a registration process, via step 504. These participant objects are then added to the participant pool in the controller, via step 506. The new participant data is then sent to the correct segment object within the controller, via step 508, so that the particular segment object has information within it relating to all the vehicles within that particular segment. In addition, a trip object vehicle is added to the controller, via step 510. Thereafter the vehicle area network is updated by the controller for routing changes, environment changes within the segment, via step 512. This updating step 512 continues until the vehicle leaves the particular controller domain. Thereafter, the participant object is removed from the participant pool, where the vehicle leaves the controller domain or ends its trip, via step 514. As can be seen, the vehicle area network, the segment objects and the controller interact to allow for a vehicle to effectively traverse a particular controller domain.

To further describe the operation of the vehicle within the controller domain and its interaction with the controller and the segment objects, refer now to the following discussion. Referring now to FIG. 6, first the vehicle enters or joins a controller domain, via step 602. Then there is a hand off and registration performed within the controller domain via the vehicle area network, via step 604. The controller then determines whether a trip plan is provided by the vehicle, via step 606. If there is no trip plan provided, then the controller can track the vehicle via its participant objects and it can generate a trip plan guess, via step 610. After a trip plan guess or a trip plan is provided, it is then determined if there are any changes required in the route provided in the trip plan by the controller, via step 608. If there are no changes, then the vehicle continues until it stops, via step 616. If there are changes, then the controller provides information about alternate routes, obstructions, and the like to the vehicle area network, via step 614. Thereafter the vehicle will eventually stop within the controller domain, via step 616. It is then determined if the vehicle is at the end of a trip, via step 618. If it is at the end of a trip, then the trip is ended and the vehicle is removed from the network. On the other hand, if the trip has not ended based on the vehicle area network or the trip plan, the controller alerts for an obstruction and executes appropriate action. The appropriate action, for example, could be to call a tow truck, to call a police officer, to call a parent, or the like, dependent upon the rules and permissions of the vehicle.

To describe the use of the segment object when vehicles are traveling through a segment associated with that segment object, refer now to the following. Referring now to FIG. 7, first a vehicle moves into a new segment, via step 702. Next, a controller adds the new participant object for this segment, via step 704. The controller then determines the number of participants in the segment, the permissions that each participant within the segment has and reconciles that for segment conditions, via step 706. So, for example, if a police car has a certain permission because there is a traffic hazard or a crime in progress, the controller could grant the police car permissions while telling all other cars to move to the side of the road. The controller then calculates the load spacing and routing for participants of each surface segment, via step 708. Thereby, the controller can manage the vehicle within the particular segment for overcrowding and can provide information to vehicles within the segment about whether that particular segment is a good place to either enter or be driving within. Finally, the controller is updated for segment load conditions, via step 710. This process 702–710 is repeated for each vehicle and as each vehicle comes into and leaves the particular segments that they are associated therewith. The vehicles within the various segments, that is, shoulder, curve, intersection, etc., segments, could interact in a variety of ways under the control of the controllers based on traffic conditions, weather conditions, and any other factors which could influence the driving within a particular segment or a particular road surface.

Figure 8:
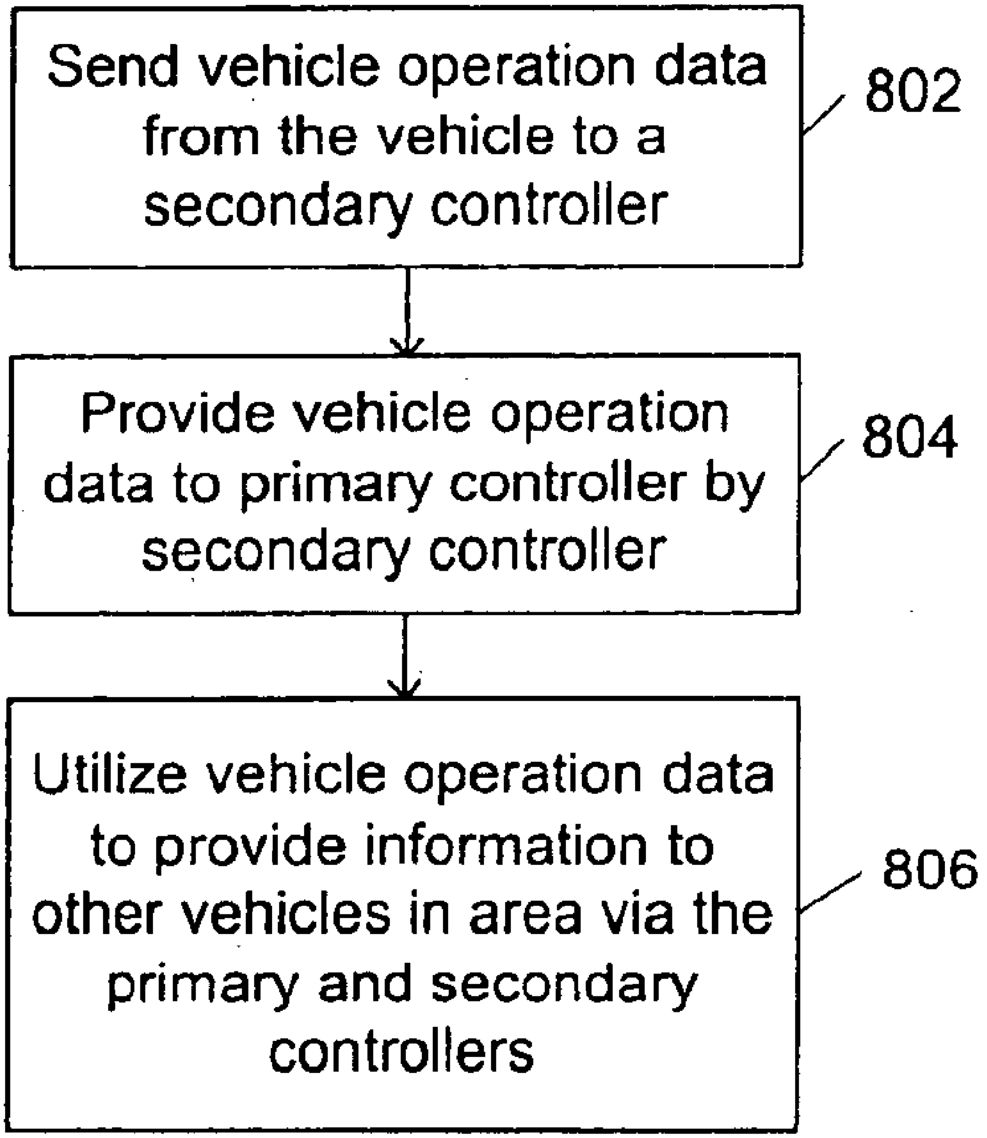
FIG. 8 is a flowchart illustrating a vehicle providing information to controller within the traffic control system.

Accordingly, utilizing data from the vehicle area network can be utilized by traffic control system 100 to provide information concerning road conditions. To describe this feature in more detail, refer now to the following discussion in conjunction with the accompanying figure. FIG. 8 is a flowchart illustrating a vehicle providing information to a controller within the traffic control system. First, data concerning vehicle operation is provided from the vehicle to a controller within the cell wherein the vehicle is traveling, via step 802. Thereafter, the controller provides the vehicle operation data to a controller that is responsible for providing suggestions to the vehicle, via step 804. The controller provides this information to a vehicle object. Accordingly, if the vehicle is within a cell, the responsible controller is the subsidiary controller. However, if the vehicle is in an area where cells overlap, a higher level controller would need to make the suggestions to the vehicle. The responsible controller utilizes the vehicle object to provide information to other vehicles in the area via the responsible controllers, via step 806.

In a first embodiment, an anti-lock braking system passes skid data to a controller in the vehicle. The vehicle area network within the vehicle passes the data along with GPS location data to a subsidiary controller within that cell. The subsidiary controller analyzes the skid data for a plurality of vehicles, which are at that location to determine if there is a problem at the particular location and adds that information to the vehicle object. Further information can then be provided to the vehicle object of the primary controller. The primary controller, in turn, can warn other vehicles through the respective subsidiary controllers if there is a problem, through the wireless communication.

In a second embodiment, a suspension system of the vehicle can be monitored by the vehicle. The data from the suspension system can be forwarded to the vehicle area network within the vehicle. The vehicle area network passes the suspension information along with the GPS location data to the subsidiary controller within that cell. The subsidiary controller then adds that information to the vehicle object. The subsidiary controller analyzes the suspension data from a plurality of vehicles passing through that GPS location and determines how rough the route is.

In a method and system in accordance with the present invention, each of the subsidiary controllers monitors a finite portion of the route and can be in direct contact with the vehicles. A regional or primary controller receives and transmits information to and from the subsidiary controller, and allows for an overall view of the route to be understood. Accordingly, through the use of the hierarchical traffic control system, traffic is controlled from cell to cell more accurately and can be controlled over a wide traffic span.

Traffic Control Based Upon Roles and Permissions

Figure 9:
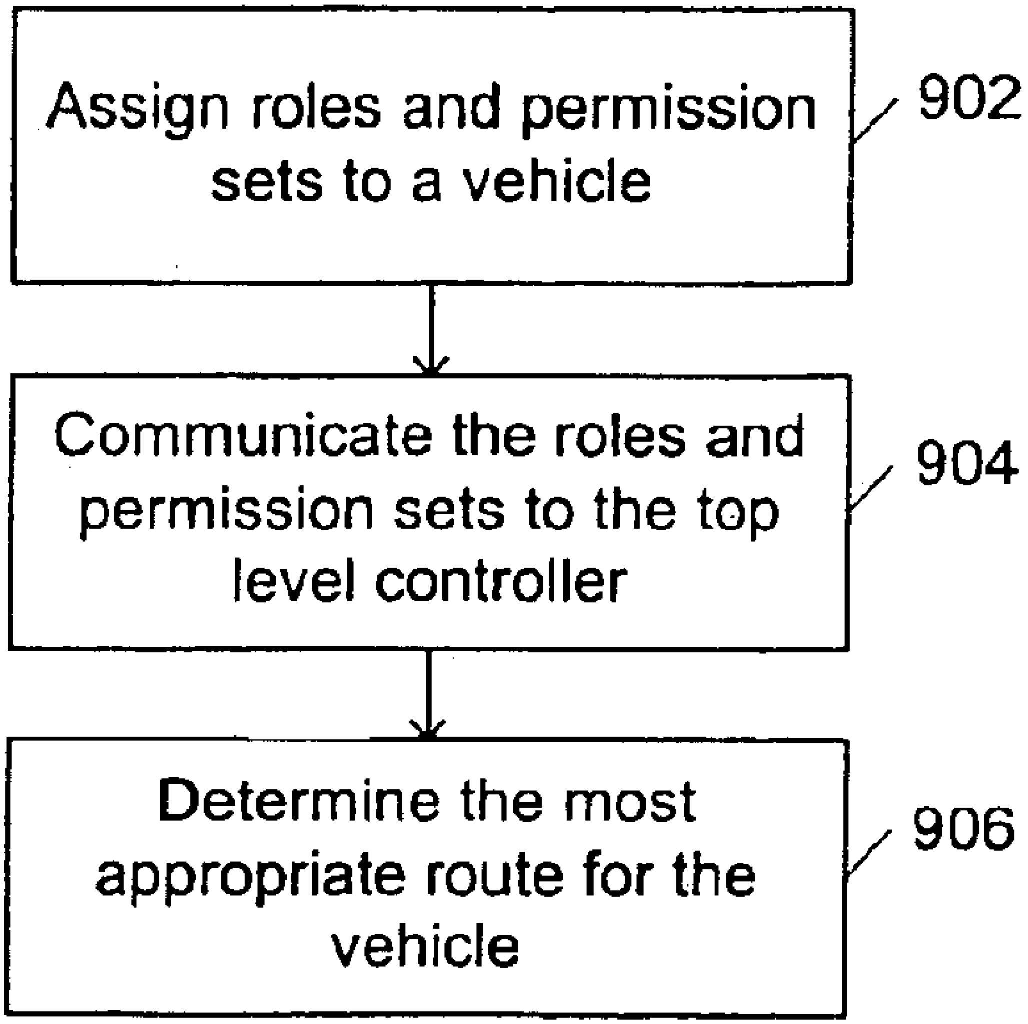
FIG. 9 illustrates the use of roles and permissions in a traffic control system.

The roles and permissions of a vehicle can be used by the traffic control system 100 to control traffic. FIG. 9 illustrates the use of roles and permissions in a traffic control system. First, roles and permissions are assigned to a vehicle, via step 902. Roles and permissions are assigned either by the user or some third party. Next, the roles and permissions are communicated to a participant object of the the primary controller, via step 904. The roles and permissions are typically communicated by a trip plan to the roles and permissions objects of the primary controller. Then the traffic control system determines the most appropriate route based upon the roles and permissions of the vehicle in relation to other vehicles, via step 906. The vehicle can communicate its progress through its vehicle area network to an appropriate participant object of the appropriate subsidiary controller object of the cell it is in and in turn to the appropriate participant object of the primary controller.

Vehicles may have different roles and permissions based upon a specific circumstance, their use or other factors. Hence, for example, a police car will have a different role and permissions status which can be communicated when a crime is in progress. The controller would then communicate to other vehicles through various participant objects that the police car has the right of way well in advance of the vehicles encountering the police car. Likewise, a fire truck or emergency vehicle may have the right of way in case of an emergency. The traffic control system (i.e., the primary controller as well as the subsidiary controller for the particular cell) would determine the most efficient route via their various participant objects. In addition, the permissions within the permission objects could be upgraded en route based upon the vehicle operator information, GPS information and the wireless communication.

With GPS, two-way communications and car instrumentation for salient characteristics such as size and weight, a particular vehicle can negotiate a permission set for a particular traffic cell. To describe this feature in more detail refer now to the following in conjunction with the accompanying Figure.

Figure 10:
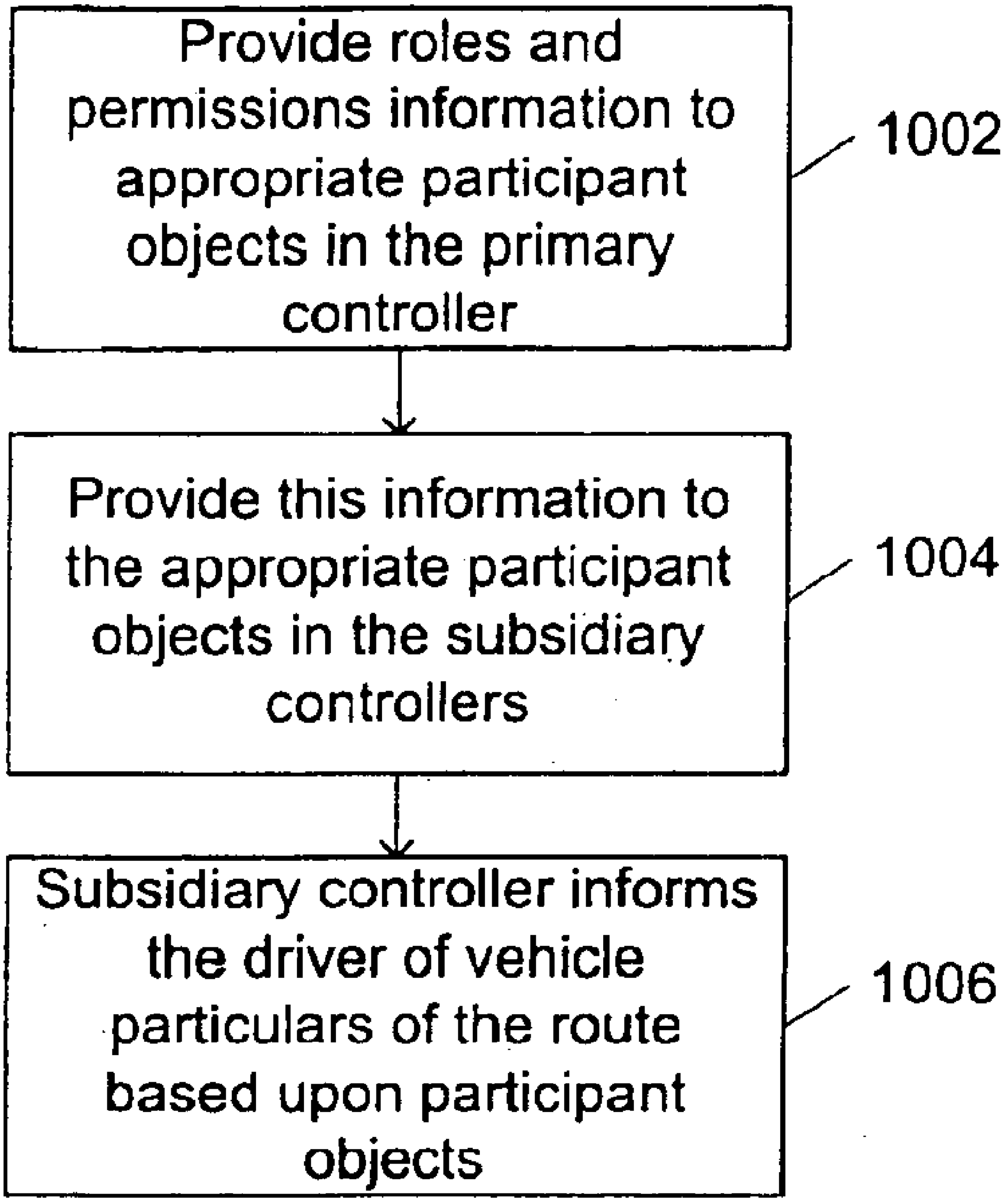
FIG. 10 is a flow chart that illustrates negotiating a permission set by a vehicle.

FIG. 10 is a flow chart that illustrates negotiating a permission set by a vehicle. At the start of the trip, the driver can declare the number of passengers via a trip plan or the vehicle instrumentation can deduce the number of passengers via the vehicle area network. The vehicle area network can then provide all of the roles and permissions information to the appropriate participant objects within the primary controller, via step 1002. The primary controller can then provide this information to the appropriate participant objects in the subsidiary controllers, via step 1004. For example, to avoid bridges which cannot support it and route to High-Occupancy-Vehicle (HOV) lanes, trucks, such as cement trucks, with lower speed capabilities, can be routed to slower lanes. Hazardous cargo trucks can be routed appropriately. Automobiles with three passengers would be routed to the appropriate HOV lanes.

The subsidiary controller for the particular cell can then tell the driver the immediate particulars of the route via information from the segment objects therewithin, via step 1006.

In addition, each of the controllers could receive information about weather conditions, hazards, disasters and other items that may affect the road conditions on each segment. This information may be obtained manually by a manager at the controller or automatically through some communication mechanism within the controller area. For example, if an emergency vehicle plots a route with the equivalent of "lights-flashing" status, then the subsidiary controller can receive that information in its participant object and then plot an emergency route through the segment object and make sure that the routes of the other vehicles in the traffic system are appropriately rerouted to stay out of the way via information from the segment object.

Accordingly, through the use of the roles and permissions for each vehicle a traffic control system can be efficiently controlled. Through this control other vehicles can be efficiently routed through obstructions, hazards or other problems. These roles and permissions are upgradable, changeable and removable by the appropriate controller by changing the appropriate participant objects therewithin.

Third Party Use of Permissions to Control Vehicle Use

Figure 11:
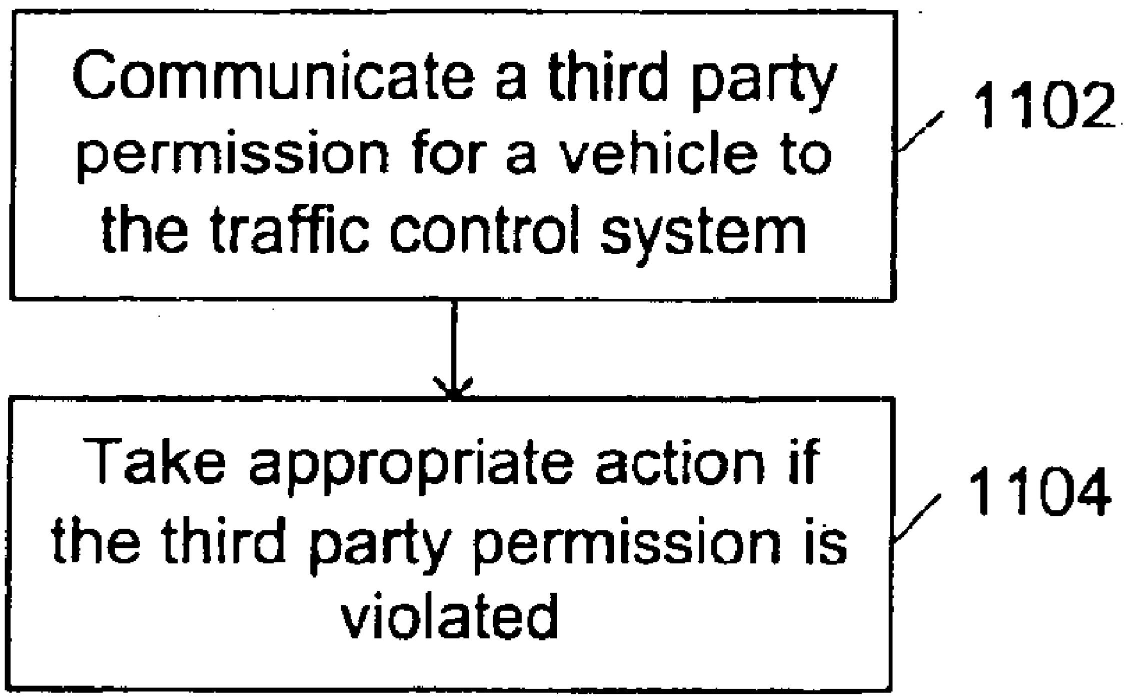
FIG. 11 is a flow chart illustrating the use of third party permissions in a hierarchical traffic control system in accordance with the present invention.

FIG. 11 is a flow chart illustrating the use of third party permissions in a hierarchical traffic control system in accordance with the present invention. First, a third party permission is communicated for a vehicle to a participant object in a controller of the traffic control system, via step 1102. Next, appropriate action is taken if the third-party permission is violated, via step 1104.

These permissions can be granted in a preferred embodiment by identification information of the user be transmitted to the traffic control system via a trip plan to the primary controller. The trip plan is then provided to a trip object within the controller. If the permission is violated the vehicle could be rendered inoperative by the controller sending the appropriate signal to the vehicle area network of the vehicle to safely stop the vehicle. Also, if the permission is violated a governmental authority or a parent could be notified. For example, the appropriate controller could call the parent's home when it receives a violation based upon a participant object related to that permission being updated. Similarly, a police station or the like could be called by the appropriate controller when a violation occurs. Accordingly, the vehicle can be effectively managed via third party permission by the traffic control system.

A system and method in accordance with the present invention provides for the use of individual operator sign-on to vehicle or default permissions without sign-on to control the parameters of operation. For example, parents can set teenager parameters, rental car owners can set driver parameters, commercial fleet managers can set parameters, permissions can be set for valet drivers. These parameters are sent to the appropriate controllers and if the vehicle violates the parameters action can be taken. These parameters can include allowable areas to operate the vehicle, e.g., can't drive to Mexico or to the liquor store, and providing for speeds and weight loads. These permissions can cover a wide range of vehicle operation as opposed to mechanical speed governors or valet keys.

CONCLUSION

Accordingly, third-party permissions can be effectively monitored through a method and system in accordance with the present invention. In addition, third party permissions can be effectively provided and monitored through such a system. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling a vehicle by a traffic control system; the method comprising the steps of:

(a) communicating a permission for the vehicle to the traffic control system, wherein the permission comprises parameters of operation for the vehicle; and (b) taking appropriate action if the permission is violated, wherein the appropriate action restricts use of the vehicle.

2. The method of claim 1 wherein the permission is provided by a trip plan for the vehicle to the traffic control system.

3. The method of claim 1 wherein the appropriate action could be any combination of rendering the at least one vehicle inoperative, notifying an agency or notifying entity responsible for the at least one vehicle.

4. A method for controlling a vehicle by a traffic control system; the method comprising the steps of:

(a) communicating a permission for the vehicle to at least one participant object of the traffic control system, wherein the permission comprises parameters of operation for the vehicle; and (b) taking appropriate action if the permission is violated, wherein in the appropriate action restricts use of the vehicle.

5. The method of claim 1 wherein the permission is provided by a trip plan for the vehicle to the participant object of the traffic control system.

6. The method of claim 1 wherein the appropriate action could be any combination of rendering the at least one vehicle inoperative via the vehicle operating system, notifying an agency or notifying an entity responsible for the at least one vehicle via a controller.

7. A computer readable medium containing program instructions for controlling a vehicle by a traffic control system; the program instructions for:

(a) communicating a permission for the vehicle to the traffic control system, wherein the permission comprises parameters of operation for the vehicle; and (b) taking appropriate action if the permission is violated, wherein the appropriate action restricts use of the vehicle.

* * * * *